United States Patent

Topp et al.

Patent Number: 5,981,918
Date of Patent: Nov. 9, 1999

[54] CIRCUIT FOR TEMPERATURE-DEPENDENT REGULATION OF THE HEATING CURRENT OF SEAT HEATERS

[75] Inventors: Rainer Topp, Reutlingen; Gerald Materna, Balingen, both of Germany

[73] Assignee: Robert Bosch GmbH, Stuttgart, Germany

[21] Appl. No.: 09/035,248

[22] Filed: Mar. 5, 1998

[30] Foreign Application Priority Data

Mar. 5, 1997 [DE] Germany .............. 197 08 867

[51] Int. Cl.[6] ....................................... H05B 1/02
[52] U.S. Cl. .................. 219/499; 219/497; 219/501; 219/202; 307/117
[58] Field of Search ............................ 219/202–206, 219/497, 499, 501, 505, 481, 488; 307/117

[56] References Cited

U.S. PATENT DOCUMENTS

| | | | |
|---|---|---|---|
| 4,516,543 | 5/1985 | Abe et al. | 219/497 |
| 4,546,238 | 10/1985 | Ahs | 219/497 |
| 4,700,046 | 10/1987 | Fristedt | 219/202 |
| 4,926,025 | 5/1990 | Wilhelm | 219/202 |
| 5,075,537 | 12/1991 | Lorenzen et al. | 219/497 |
| 5,288,974 | 2/1994 | Hanzic | 219/501 |

FOREIGN PATENT DOCUMENTS 3818974  2/1990  Germany .

*Primary Examiner*—Mark Paschall
*Attorney, Agent, or Firm*—Kenyon & Kenyon

[57] ABSTRACT

A circuit is provided for temperature-dependent control of the heating current of seat heaters to detect with a high functional reliability an interruption in the lead wire to a temperature element and to shut down the heating current in the event that an interrupt is found.

7 Claims, 2 Drawing Sheets

CIRCUIT FOR TEMPERATURE-DEPENDENT REGULATION OF THE HEATING CURRENT OF SEAT HEATERS

FIELD OF THE INVENTION

The present invention relates to a circuit for temperature-dependent regulation of a heating current of a seat heater.

BACKGROUND INFORMATION

A circuit for regulating the heating current of seat heaters is described in German Patent Application No. DE 38 18 974. In particular, a thermostatic regulator is used to compare the measured seat temperature with a predetermined setpoint and to turn the seat heater on or off accordingly.

SUMMARY OF THE INVENTION

An advantage of the circuit according to the present invention is that it detects an interruption in a lead wire to a temperature element which measures the temperature of the seat to be heated.

In an exemplary embodiment, two required reference signal sources are implemented easily by a voltage divider with two taps.

It is especially advantageous to provide a delay means to achieve delayed activation of the interrupt detection function when the seat heater is turned on. This allows the magnitude of the interrupt reference voltage to be less critical, which is necessary in particular when the lines to the temperature element or a reference voltage divider cannot be run together and must carry different current loads due to the boundary conditions of the wiring options. This is the case, for example, with a completely monolithic integration of the control circuit, when only a limited number of connecting lines to the power ASIC are available. At the same time, however, it must be possible to shut down the system using the ignition switch of the vehicle without the heating current placing an extra load on the system. In such a case, the delay means can ensure that interrupt detection will work reliably in the case of an interruption in the lead wire to the temperature element, i.e., it will reliably suppress an unacceptable continuous current, but it will not give a false response at extremely low ambient temperatures of the system including the seat plus the seat heater. Therefore, it will not interfere with the availability of the seat heater at cold temperatures in particular.

An inexpensive implementation of the delay means may include a monoflop element which deactivates the interrupt detection via an OR element for a predetermined period of time after the seat heater has been switched on.

Even greater functional reliability is guaranteed if the monoflop delivers a pulse with a temperature-dependent period, in particular a long period at low ambient temperatures. Due to the temperature dependence of the pulse period, further heating of the seat is reliably suppressed even in the event the seat is already hot and the lead wire to the temperature element is interrupted.

An embodiment of the monoflop element with an oscillator leads to complete integration capability of an intelligent heating switch, which is preferably designed as a power semiconductor switch.

DETAILED DESCRIPTION OF THE INVENTION

Figure 1:
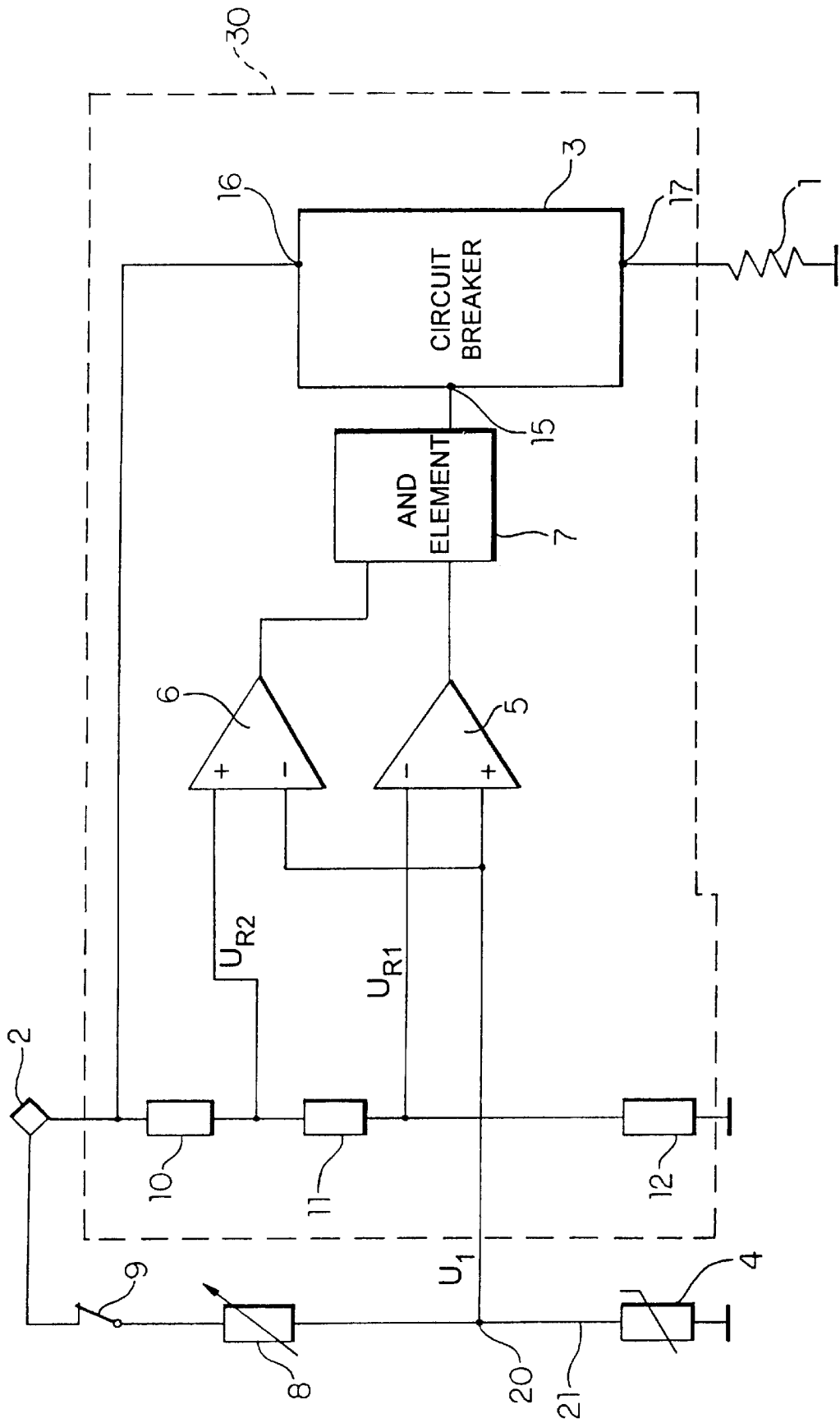
FIG. 1 shows a circuit with interrupt detection in accordance with an exemplary embodiment of the present invention.

FIG. 1 shows an intelligent heater switch 30 for temperature-dependent regulation of the heating current through a heater coil 1. A temperature element 4, which is designed as an NTC resistor (NTC=negative temperature coefficient), is connected via lead wire 21 and connecting node 20 to a controller 8 in the form of a controllable resistor which is in turn connected to a battery terminal 2 via switch 9. Battery terminal 2 is also connected to a first load input 16 of circuit breaker 3, whose second load input 17 is connected to heater coil 1. Battery terminal 2 is also connected to ground across first, second and third voltage divider resistors 10, 11 and 12. The circuit has two comparing means in the form of comparators (differential connections) 5 and 6. The non-inverting input of comparator 5 is connected to connecting node 20. The inverting input is connected to a tap between second and third voltage divider resistors 11 and 12. The output of comparator 5 is connected to one input of AND element 7. The other comparator 6 is connected via its non-inverting input to a tap between the first and second voltage divider resistors 10 and 11. The inverting input is electrically connected to connecting node 20. The output of the other comparator 6 is connected to the second input of AND element 7. The output of the AND element controls the heating current through heater coil 1 via control input 15 of circuit breaker 3.

The circuit according to FIG. 1 adjusts the temperature in the seat surface and keeps it at an adjustable temperature level with the help of the NTC resistor as a temperature sensor and the heater coil, both of which are accommodated in the seat surface of a motor vehicle seat. In addition to a main function, i.e., setting the desired temperature, a safety function is also integrated into the circuit, which is implemented in the form of an integrated component to detect an interruption in the lead wire to the NTC resistor as a defect, and then shut down the heater coil. A voltage divider is formed by controller 8 and NTC resistor 4 between a battery voltage at battery terminal 2 and ground, supplying a signal which depends on the seat temperature, temperature voltage $U_1$ which depends on the NTC resistance value. The lower the seat temperature, the higher the temperature voltage $U_1$. This voltage is compared by comparator 5 with threshold voltage $U_{R1}$ applied between the second and third voltage divider resistors 11 and 12. When temperature voltage $U_1$ is higher than threshold voltage $U_{R1}$, the current through heater coil 1 is turned on, and when this voltage is lower than the threshold voltage, the heater current is turned off. The threshold voltage is usually 30% to 70% of the battery voltage, so that with NTC resistors having conventional nominal resistance values of 1 to 10 k$\Omega$ in the control temperature range, it is possible to set the temperature control point via controller 8 with a controllable resistance on the same order of 1 to 10 k$\Omega$.

To prevent an interruption in lead wire 21 to temperature element 4 from leading to a permanent activation of the heater coil, which would be an undesirable and safety-critical condition, temperature voltage $U_1$ is compared by the additional comparator 6 with an interrupt reference voltage $U_{R2}$ which is applied between the first and second voltage divider resistors 10 and 11 and is greater than threshold voltage $U_{R2}$. Activation of the heater coil when temperature voltage $U_1$ is too high is prevented by a logic link, AND element 7. Interrupt reference voltage $U_{R2}$ must be set so high that suppression of the heating current by the additional comparator circuit 6 is not activated in any case at any resistance value that can be assumed by the NTC resistor in the allowed temperature ranges in normal operation. This is true in particular for very low initial temperatures of the seat when the seat heater is turned on by load switch 9, e.g., at −40° C., where the NTC resistor can assume very high values in the range of 100 kΩ to 1 MΩ because of its temperature characteristic. This means that interrupt reference voltage $U_{R2}$ must be in the range of 99% to almost 100% of the battery voltage so that the possibility of a false response of the interrupt detection is ruled out.

Under some circumstances, when there is an unfavorable voltage drop on the lines, the critical magnitude of interrupt reference voltage $U_{R2}$ may cause interrupt detection to malfunction. This is the case in particular when there is a voltage drop on the line between battery terminal 2 and switch 9 with which the heater and thus temperature regulation are activated. This voltage drop is very likely to occur in particular when the series connection of controller 8 and NTC resistor 4 is run across an ignition switch 34 (FIG. 2), downstream of which there are connected other loads of a motor vehicle wiring system, while the series connection of voltage divider resistors 10, 11, 12 is connected directly to the battery terminal. To avoid this critical design and the risk of failure of interrupt detection, an additional function is added in the form of a circuit like that illustrated in FIG. 2.

Figure 2:
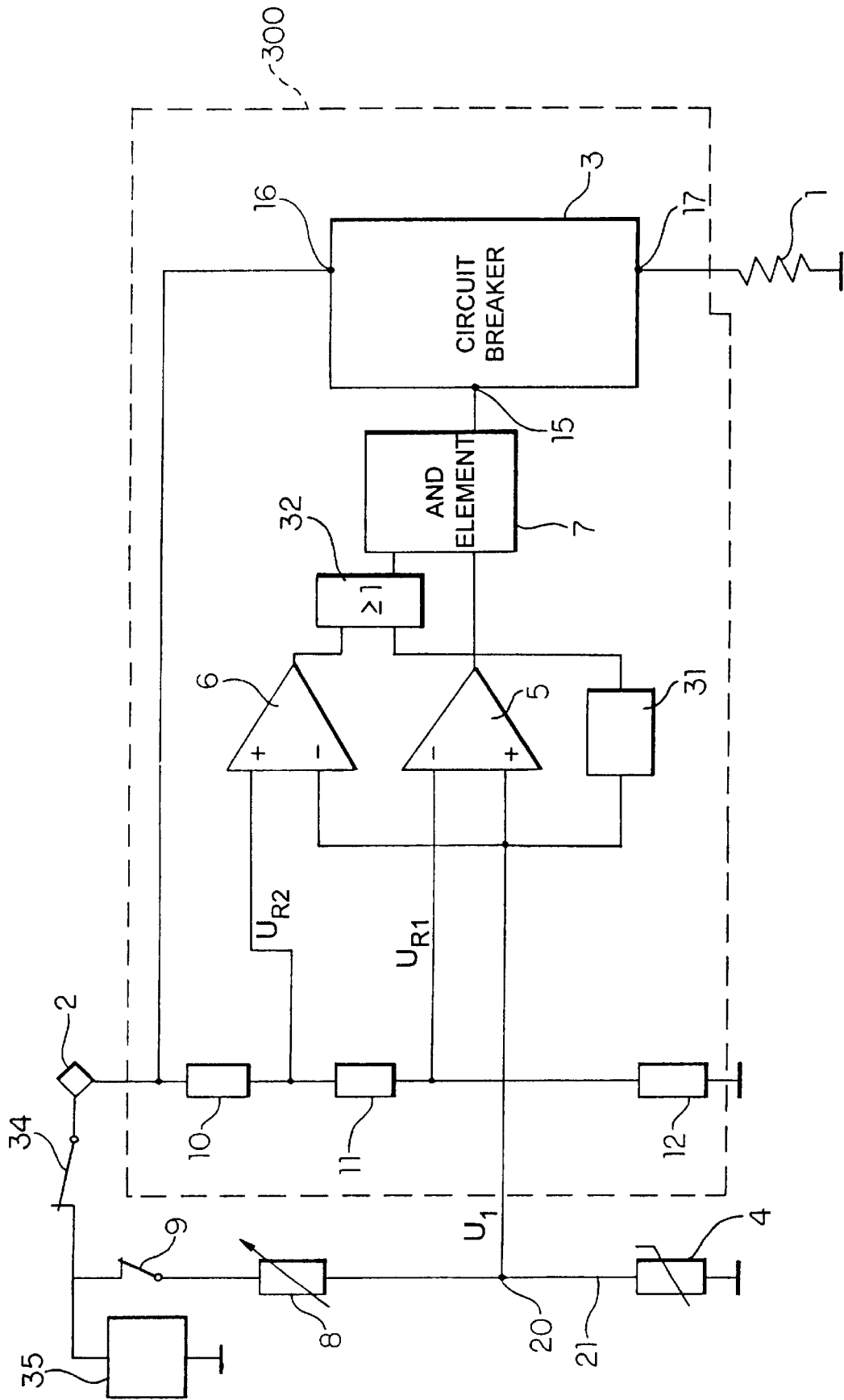
FIG. 2 shows a circuit with interrupt detection and a delay circuit in accordance with an exemplary embodiment of the present invention.

In addition to the components and reference notation from FIG. 1, the circuit according to FIG. 2 has the following additional features: in addition to ignition switch 34, additional battery loads 35 are symbolically indicated downstream from switch 9, as seen from the battery terminal. Integrated intelligent heater switch 300 has a delay circuit 31, 32, composed of monoflop element 31 and OR element 32. The input of the monoflop element is connected to connecting node 20. The output of the monoflop element is applied to the input of OR element 32, with the other input of OR element 32 connected to the output of the other comparator 6. The output of OR element 32 leads to an input of AND element 7; the other input of AND element 7 is connected to the output of comparator 5, as shown in FIG. 1.

Monoflop element 31 is triggered by a positive switch-on pulse edge at connecting node 20 which appears due to the closing of switch 9, and a positive pulse with a certain pulse period is generated. During the pulse period, any effect of the interrupt detection is suppressed by logic OR link 32. This means that, for example, when the seat heater function is started up at very low ambient temperatures, the heating effect cannot be stopped due to false interrupt detection. Consequently, the seat heater and thus also the NTC resistor is heated in any case until the end of the pulse. This ensures that, before activation of interrupt detection, the NTC resistor will have reached a certain minimum temperature, which makes it possible for interrupt reference voltage $U_{R2}$ not to be set as critically as would be necessary without delayed activation of the interrupt detection. If the seat heater has already reached the desired temperature before the end of the monoflop pulse, the seat heater is turned off via AND element 7 even before the end of the pulse. With a suitable choice of the delay time (e.g., 1 to 2 minutes), which is given by the pulse duration of the monoflop element, it is possible to set interrupt reference voltage $U_{R2}$ in the range of 95% to 98% of the battery voltage without causing a false interrupt detection response when the system is started at very low temperatures.

Monoflop element 31 may be constructed specifically with a reset unit, an oscillator unit and a downstream counter chain. An oscillator in the MHZ range has only a low capacitance which can easily be integrated. Except for the series connection of controller 8 and temperature element 4 plus heater coil 1, all these components can be integrated on one chip.

Another variant is derived by having the pulse period of the monoflop element depend on the ambient temperature. It is especially advantageous here to provide a separate temperature sensor to make the ambient temperature-dependent control of the time delay independent of a malfunction of temperature element 4. For example, it is possible to set the pulse period to one minute at an ambient temperature of −40° C. to −20° C., to half a minute at an ambient temperature of −20° C. to 0° C., and to let the pulse period drop to a negligible level at temperatures above 0° C. In such an embodiment, the heating current is switched off immediately although the seat is already hot and the lead wire to the NTC resistor is interrupted.

What is claimed is:

1. A circuit for a temperature-dependent regulation of a heating current of a seat heater, comprising:

a first temperature element providing a temperature-dependent signal;

a first reference signal source providing a first reference signal;

a first comparator having a first input coupled to the first temperature element, having a second input coupled to the first reference signal source, and having a first output;

a second reference signal source providing a second reference signal;

a second comparator having a first input coupled to a voltage supply lead to the first temperature element, having a second input coupled to the second reference signal source, and having a second output;

a delay element, the first output being coupled to the second output via the delay element; and a switch for activating the heating current, the switch being switched to an on position when a temperature of the first temperature element is below a first predetermined level, the switch being switched to an off position when i) the temperature of the first temperature element has reached a desired temperature value, or ii) a signal on the voltage supply lead wire has not fallen below the second reference signal after a delay period defined by the delay element, whichever occurs first.

2. The circuit according to claim 1, wherein the first comparator includes a first non-inverting input and a first inverting input, the first temperature element being coupled to the first non-inverting input, and the first reference signal source being coupled to the first inverting input, and wherein the second comparator includes a second non-inverting input and a second inverting input, the second reference signal source being coupled to the second non-inverting input and the first temperature element being coupled to the second inverting input.

3. The circuit according to claim 1, wherein the first comparator includes a non-inverting input, and the delay element includes a monoflop element and an OR element, an input of the monoflop element being coupled to the non-inverting input, and an output of the monoflop element being coupled to an input of the OR element, the circuit further comprising:

an AND element, an output of the OR element being coupled to the AND element.

4. The circuit according to claim 1, wherein a duration of the delay period depends on the temperature of the first temperature element.

5. The circuit according to claim 3, wherein the monoflop element includes an oscillator, the circuit further comprising:
- a second temperature element regulating an oscillator frequency of the oscillator.

6. The circuit according to claim 1, wherein the switch is an intelligent heater switch, and wherein the switch, the first comparator and the second comparator are monolithically integrated.

7. A circuit for a temperature-dependent regulation of a heating current of a seat heater, comprising:
- a temperature element providing a temperature-dependent signal;
- a battery terminal;
- a voltage divider coupled between the battery terminal and a ground, the voltage divider including a first resistor, a second resistor and a third resistor, the first resistor, the second resistor and the third resistor being connected in series, the voltage divider having a first tap between the second resistor and the third resistor for providing a first reference signal and a second tap between the first resistor and the second resistor for providing a second reference;
- a first comparator coupled to the temperature element and the first tap, and having a first output;
- a second comparator coupled to the temperature element and the second tap, and having a second output;
- a delay element, the first output being coupled to the second element via the delay element; and
- a switch for activating the heating current, the switch being switched to an on position when a temperature of the temperature element is below a first predetermined level, the switch being switched to an off position when i) the temperature of the first temperature element has reached a desired temperature value, or ii) a signal on the voltage supply lead wire has not fallen below the second reference signal after a delay period defined by a delay element, whichever occurs first.

* * * * *